US010731628B1

(12) United States Patent
Gadiraju et al.

(10) Patent No.: US 10,731,628 B1
(45) Date of Patent: Aug. 4, 2020

(54) SYSTEM AND METHOD FOR COORDINATED CONTROL OF REACTIVE POWER FROM A GENERATOR AND A REACTIVE POWER COMPENSATION DEVICE IN A WIND TURBINE SYSTEM

(71) Applicant: General Electric Company, Schenectady, NY (US)

(72) Inventors: Kasi Viswanadha Raju Gadiraju, Bangalore (IN); Olive Ray, Kolkata (IN); Yashomani Yashodhan Kolhatkar, Bangalore (IN); Arvind Kumar Tiwari, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/403,789

(22) Filed: May 6, 2019

(51) Int. Cl.
| | | |
|---|---|---|
| F03D 7/02 | (2006.01) | |
| F03D 7/04 | (2006.01) | |
| H02M 1/02 | (2006.01) | |
| H02J 3/38 | (2006.01) | |

(52) U.S. Cl.
CPC ........... *F03D 7/0272* (2013.01); *F03D 7/047* (2013.01); *F03D 7/048* (2013.01); *H02J 3/386* (2013.01); *H02M 1/02* (2013.01)

(58) Field of Classification Search
CPC ........ F03D 7/0272; F03D 7/047; F03D 7/048; H02J 3/386; H02M 1/02
See application file for complete search history.

(56) References Cited

U.S. PATENT DOCUMENTS

| 904,607 | A | | 11/1908 | Elmblad | |
|---|---|---|---|---|---|
| 5,952,816 | A | * | 9/1999 | Larsen | .................... H01F 38/18 323/209 |
| 6,924,565 | B2 | | 8/2005 | Wilkins et al. | |
| 7,013,203 | B2 | | 3/2006 | Moore et al. | |
| 7,071,579 | B2 | | 7/2006 | Erdman et al. | |
| 7,095,597 | B1 | | 8/2006 | Cousineau | |
| 7,166,928 | B2 | | 1/2007 | Larsen | |
| 7,245,037 | B2 | | 7/2007 | Angquist et al. | |
| 7,567,160 | B2 | | 7/2009 | Folts et al. | |
| 7,923,862 | B2 | | 4/2011 | Cardinal et al. | |
| 8,653,685 | B2 | | 2/2014 | Garcia | |
| 8,664,788 | B1 | * | 3/2014 | Wagoner | ............... F03D 7/0244 290/44 |

(Continued)

FOREIGN PATENT DOCUMENTS

WO WO2014/044007 A1 3/2014

*Primary Examiner* — Tulsidas C Patel
*Assistant Examiner* — Joseph Ortega
(74) *Attorney, Agent, or Firm* — Dority & Manning, P.A.

(57) ABSTRACT

A method is provided for operating a power generation system that supplies real and reactive power to a grid, the power generation system including a generator/power converter, and a reactive power compensation device. A total reactive power demand (Qcmd) made on the power generation system is determined, as well as a maximum reactive power capacity for each of a generator stator-side reactive power (Qs), a generator line-side reactive power (Ql), and reactive power from the reactive power compensation device (Qmvb). Allocation of (Qs), (Ql), and (Qmvb) to supply (Qcmd) is coordinated by prioritizing (Qmvb) as a first source of reactive power, and one or both of (Qs) and (Ql) as a second source of reactive power.

20 Claims, 6 Drawing Sheets

(56) References Cited

U.S. PATENT DOCUMENTS

| | | |
|---|---|---|
| 8,664,800 B2 | 3/2014 | Galbraith et al. |
| 8,847,562 B2 | 9/2014 | Agudo Araque |
| 9,214,883 B2 | 12/2015 | Kim et al. |
| 9,236,742 B2 | 1/2016 | Garcia |
| 9,366,233 B2 | 6/2016 | Bech et al. |
| 9,407,186 B2 | 8/2016 | Babazadeh et al. |
| 9,419,439 B2 | 8/2016 | Nielsen |
| 9,556,852 B2 | 1/2017 | Babazadeh et al. |
| 9,556,853 B2 | 1/2017 | Gupta et al. |
| 9,660,448 B2 | 5/2017 | Ellena et al. |
| 2002/0103745 A1* | 8/2002 | Lof ............ G06Q 40/04 705/37 |
| 2003/0011348 A1* | 1/2003 | Lof ............ H02J 3/382 322/37 |
| 2009/0079191 A1* | 3/2009 | Mari ............ H02P 9/14 290/43 |
| 2011/0140430 A1* | 6/2011 | Ritter ............ H02M 5/458 290/44 |
| 2012/0019188 A1* | 1/2012 | Fukutani ............ H02J 3/1892 318/729 |
| 2012/0205981 A1* | 8/2012 | Varma ............ H02J 3/01 307/64 |
| 2013/0215652 A1* | 8/2013 | Komatsu ............ H02J 3/386 363/37 |
| 2014/0175887 A1 | 6/2014 | Shao et al. |
| 2015/0027068 A1 | 1/2015 | Sayers et al. |
| 2015/0365031 A1* | 12/2015 | Wessels ............ H02J 3/1885 290/44 |
| 2016/0128231 A1 | 5/2016 | Wagoner et al. |
| 2016/0268940 A1 | 9/2016 | Achilles et al. |
| 2017/0025858 A1 | 1/2017 | Garcia et al. |
| 2017/0198681 A1* | 7/2017 | Petri Ortega ......... F03D 7/0276 |
| 2018/0041154 A1* | 2/2018 | Larsen ............ F03D 9/255 |
| 2018/0048157 A1* | 2/2018 | Kolwalkar ............ H02J 3/381 |
| 2018/0052478 A1* | 2/2018 | Varma ............ G05F 1/66 |
| 2020/0076193 A1* | 3/2020 | Biris ............ F03D 9/255 |

* cited by examiner

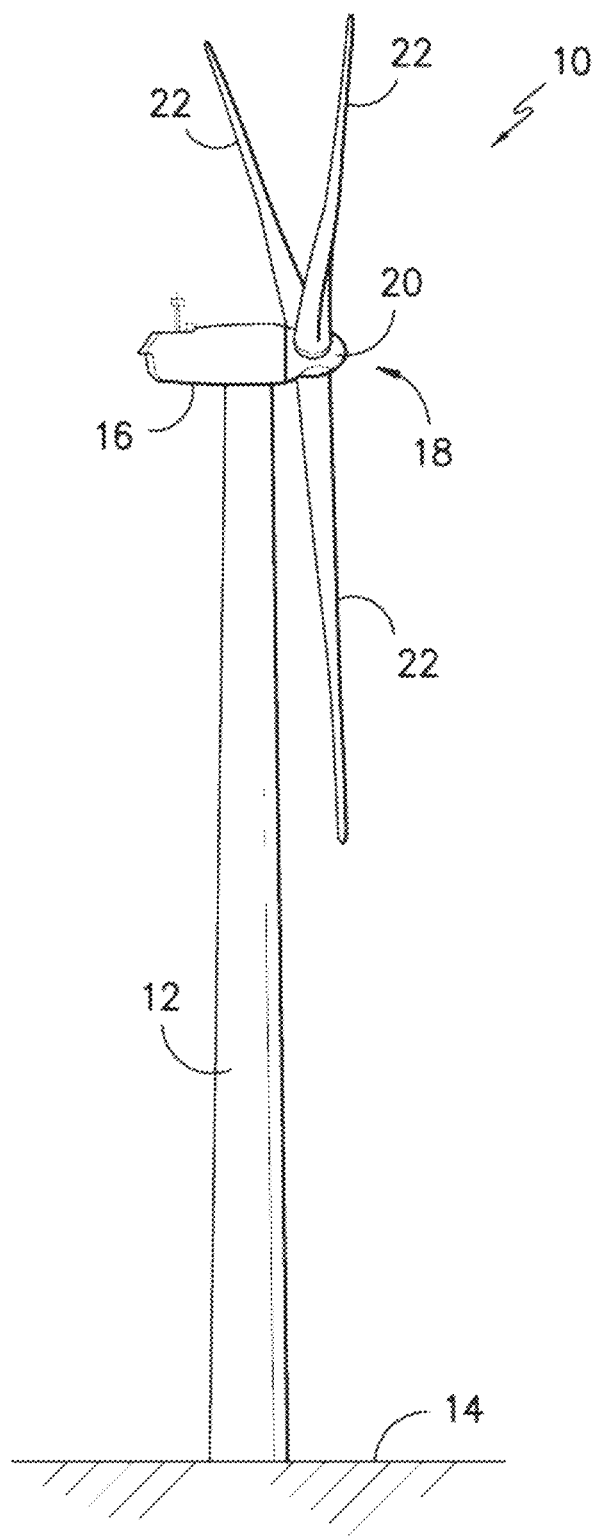
FIG. -1-

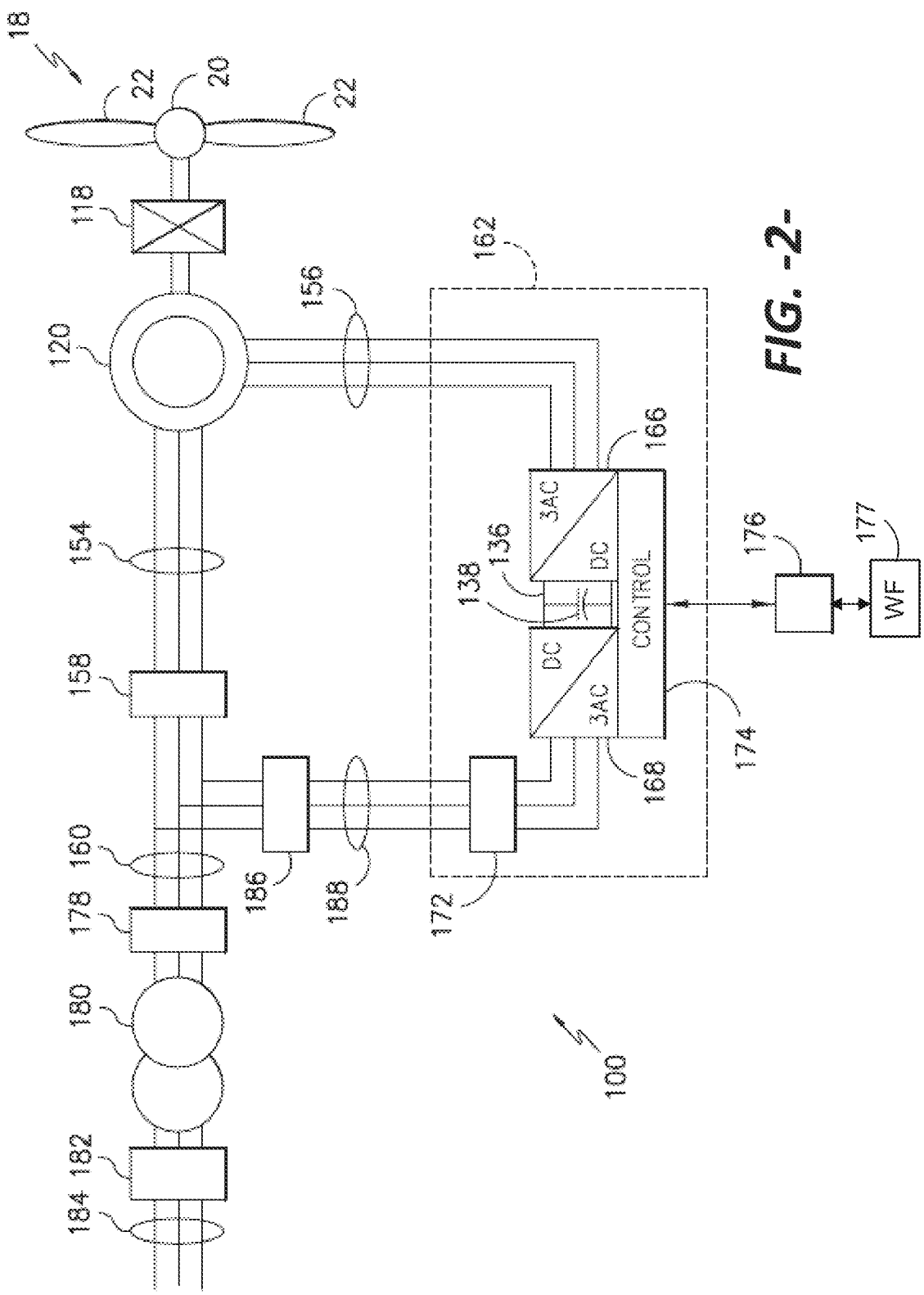
FIG. -2-

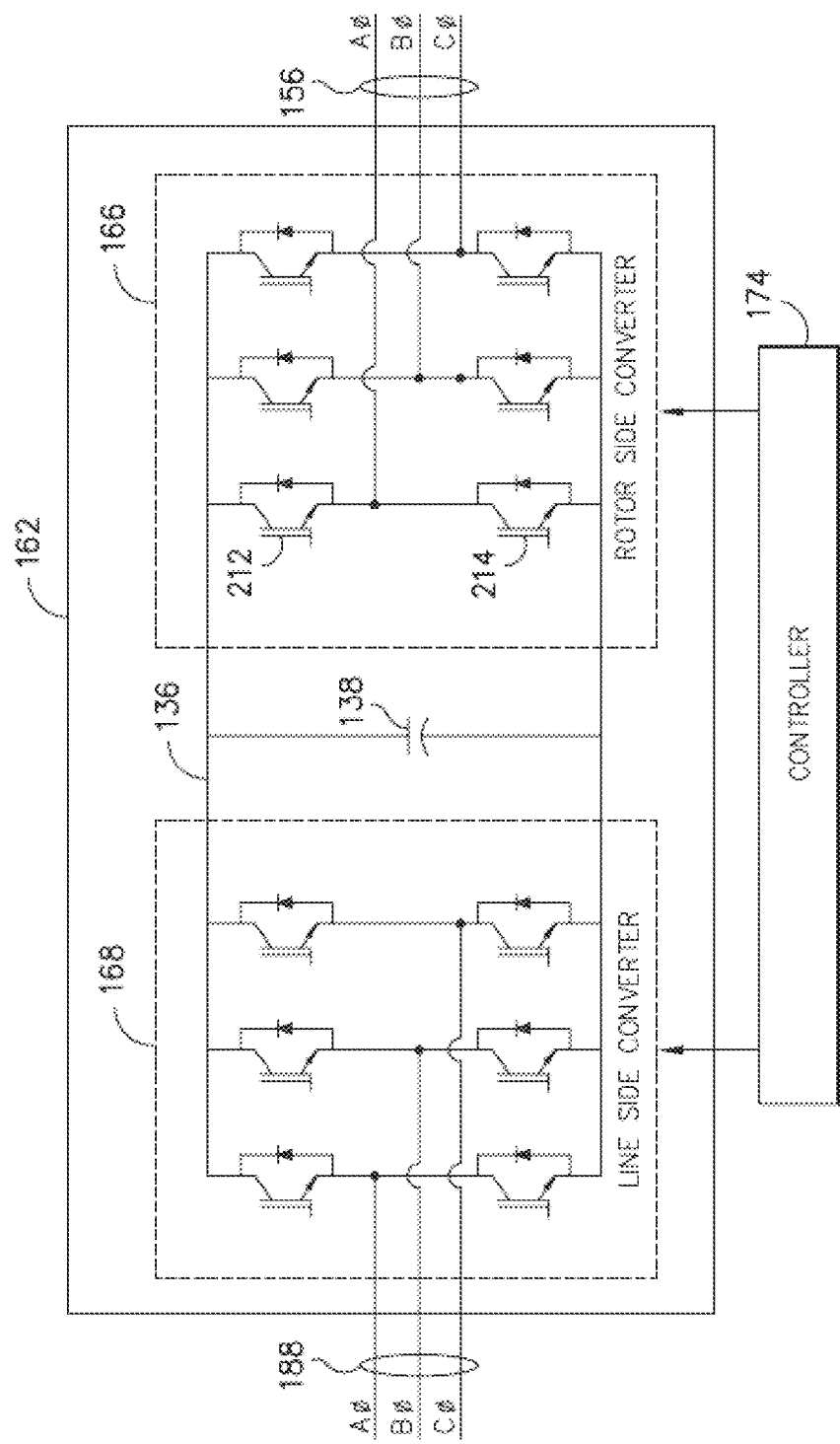
FIG. -3-

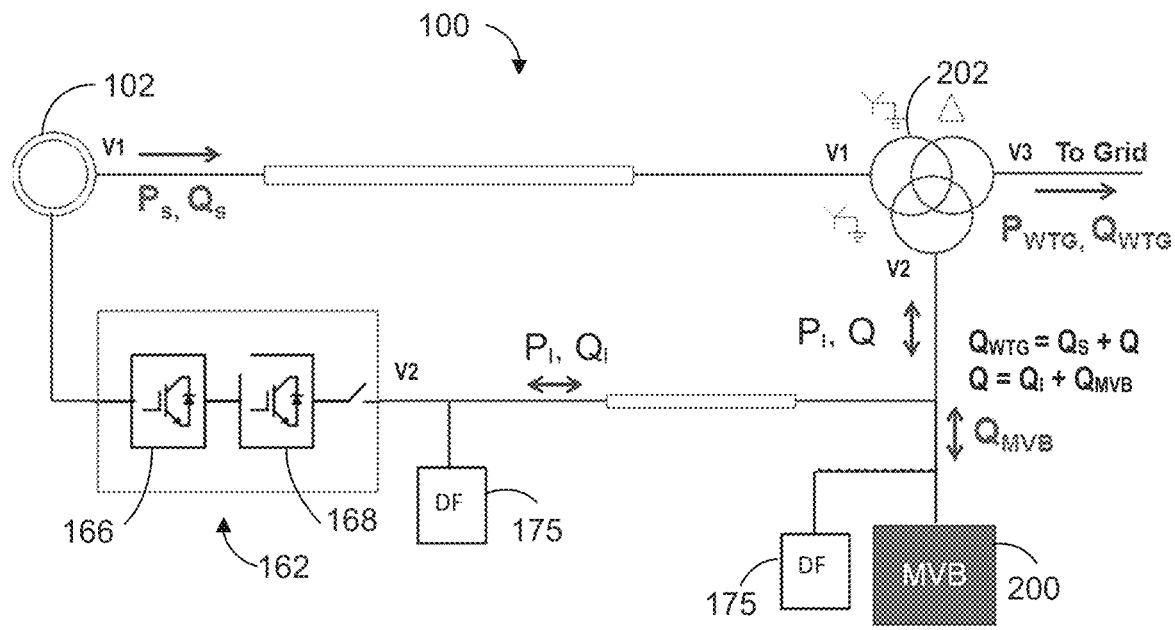
FIG. -4-
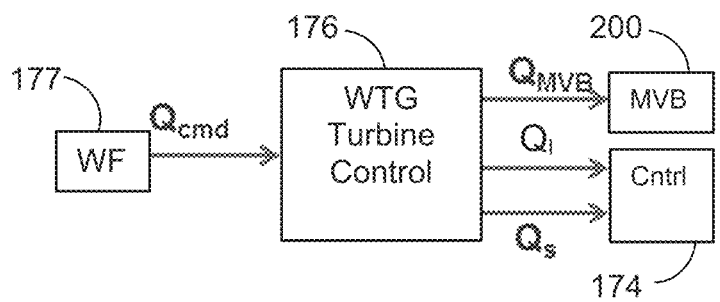
FIG. -5-
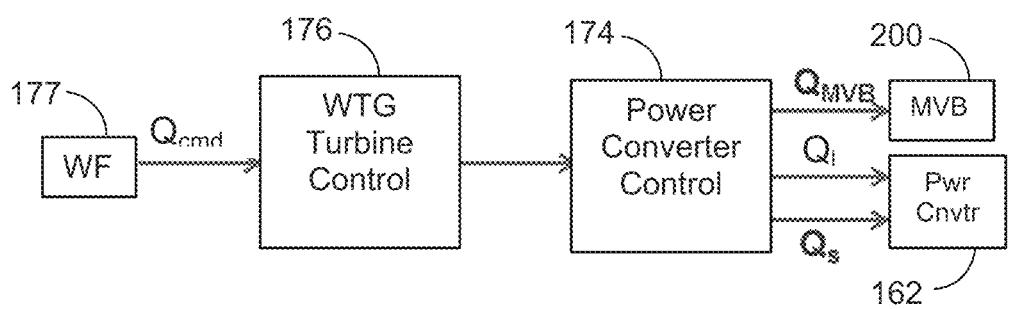
FIG. -6-

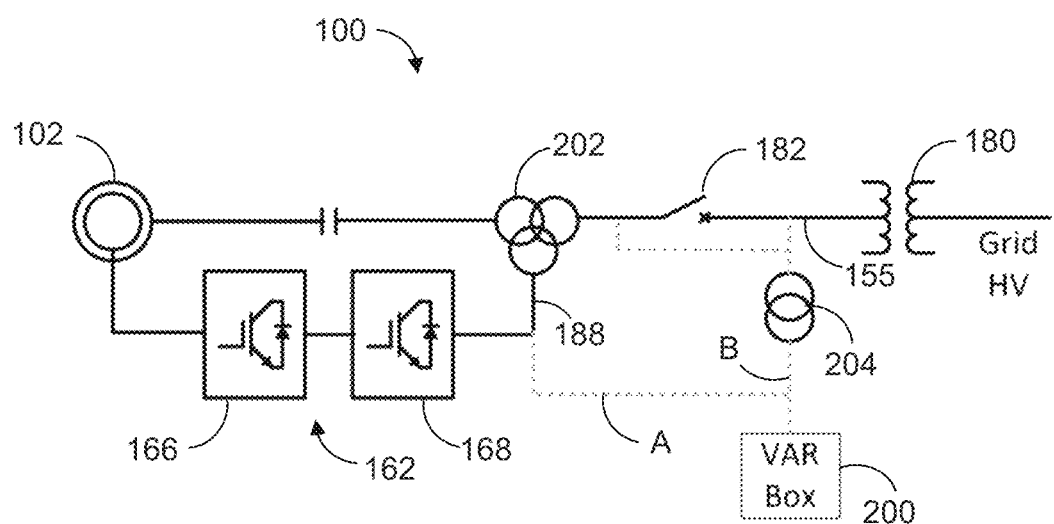
FIG. -7-

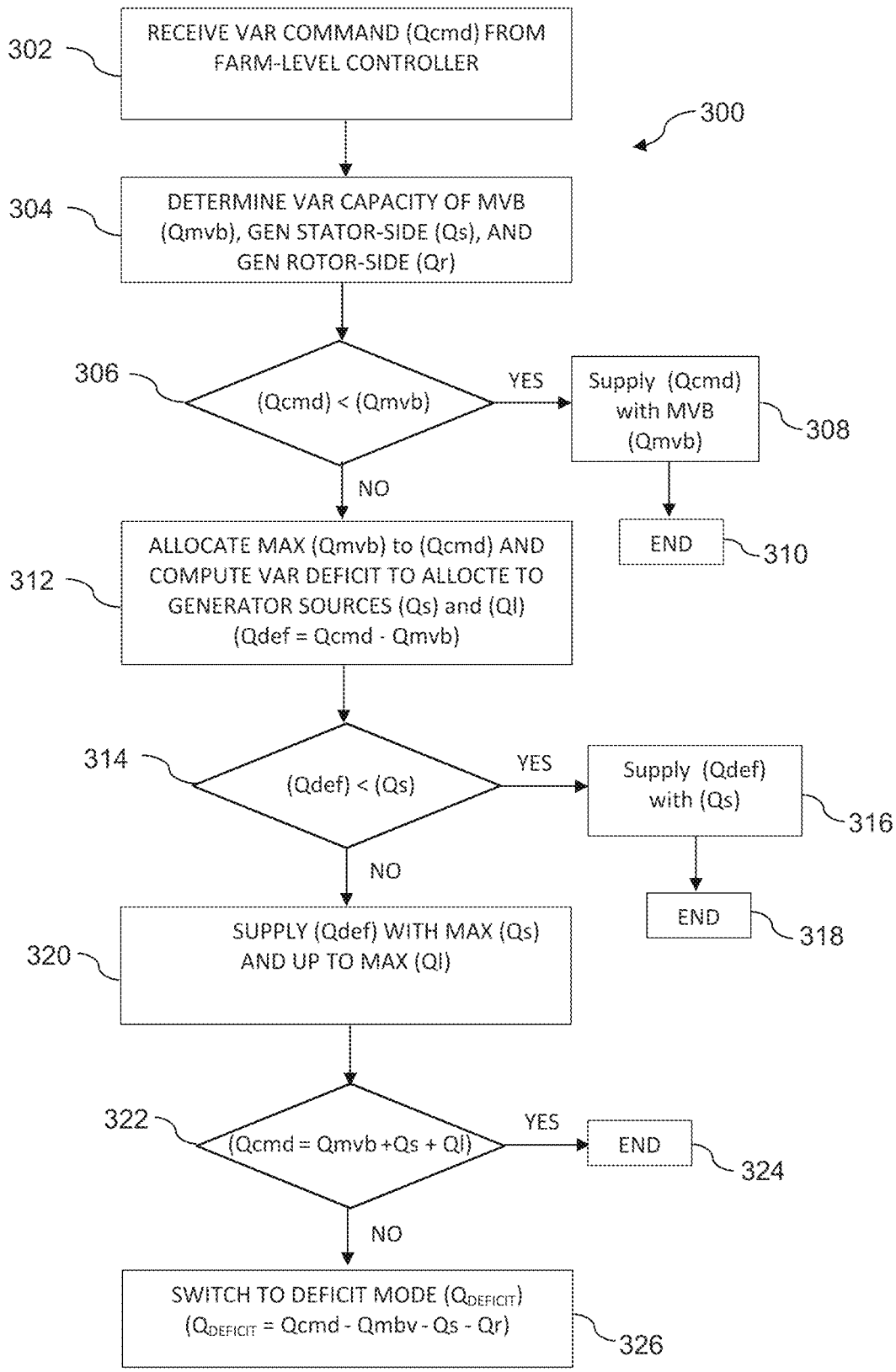
FIG. -8-

SYSTEM AND METHOD FOR COORDINATED CONTROL OF REACTIVE POWER FROM A GENERATOR AND A REACTIVE POWER COMPENSATION DEVICE IN A WIND TURBINE SYSTEM

FIELD

The present disclosure relates generally to power generating systems, and, more particularly, to a system and method for coordinated control of various sources of reactive power in a wind turbine system.

BACKGROUND

Generally, during operation of a wind turbine, wind impacts the rotor blades and the blades transform wind energy into a mechanical rotational torque that drives a low-speed shaft. The low-speed shaft drives a gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. Each of the RSC and the LSC typically includes a bank of pulse width modulated switching devices, for example insulated gate bipolar transistors (IGBT modules). The LSC converts the DC power on the DC link into AC output power that is combined with the power from the generator stator to provide multi-phase power having a frequency maintained substantially at the frequency of the electrical grid bus (e.g. 50 HZ or 60 HZ).

The above system is generally referred to as a doubly-fed induction generator (DFIG) system, whose operating principles include that the rotor windings are connected to the grid via slip rings and the power converter controls rotor current and voltage. Control of rotor voltage and current enables the generator to remain synchronized with the grid frequency while the wind turbine speed varies (e.g., rotor frequency can differ from the grid frequency). Also, the primary source of reactive power from the DFIG system is from the RSC via the generator (generator stator-side reactive power) and the LSC (generator line-side reactive power). Use of the power converter, in particular the RSC, to control the rotor current/voltage makes it is possible to adjust the reactive power (and real power) fed to the grid from the RSC independently of the rotational speed of the generator. In addition, the generator is able to import or export reactive power, which allows the system to support the grid during extreme voltage fluctuations on the grid.

Typically, the amount of reactive power to be supplied by a wind farm to the grid during steady-state and transient conditions is established by a code requirement dictated by the grid operator, wherein a wind farm controller determines the reactive power demand made on each wind turbine within the wind farm. A local controller at each wind turbine receives and allocates the reactive power demand between the generator sources (e.g., between generator-side reactive power and line-side reactive power).

It is known to augment the reactive power capability of a wind farm by use of reactive power compensation devices, such as Static VAR compensator (SVC) or Static VAR Generator (SVG) devices, at one or more common collector buses shared by the wind turbines. For example, U.S. Patent Application Pub. No. 2017/0025858 describes a wind power plant connected to an electrical grid, the power plant including a plurality of wind turbine generators and a Static Synchronous Compensator (STATCOM) device on a common bus with the wind turbine generators. In a first control mode, the wind turbine generators and STATCOM are operated in master-slave relationship for reactive power generation. Upon a trigger signal, such as a low voltage event on the grid, a second control mode is implemented wherein the wind turbine generators and STATCOM are switched to a slave-master relationship for reactive power generation.

An improved system and method that integrates an auxiliary reactive power source at a local level with the wind turbine and coordinates generation of reactive power from the different local sources at the wind turbine level would be desirable in the industry.

BRIEF DESCRIPTION

Aspects and advantages of the invention will be set forth in part in the following description, or may be obvious from the description, or may be learned through practice of the invention.

In one aspect, the present disclosure is directed to a method for operating a power generation system that supplies real and reactive power to a grid, the power generation system including a generator with a power converter and a dedicated individual integrated reactive power compensation device. This reactive power compensation device is "dedicated" to the power generation system in that it is integrated solely with the generator system as a source of auxiliary reactive power thereto, and is not common or shared between a plurality of power generation systems. The method includes determining a total reactive power demand (Qcmd) made on the power generation system at a real-time operating state of the power generation system and grid state. A maximum reactive power capacity is determined for each of a generator stator-side reactive power (Qs), a generator line-side reactive power (Ql), and reactive power from the reactive power compensation device (Qmvb). Supply of (Qcmd) from between (Qs), (Ql), and (Qmvb) is coordinated at the real-time operating state of the power generation system and the grid state, wherein (Qmvb) is prioritized as a first source of reactive power, and one or both of (Qs) and (Ql) as a second source of reactive power.

The coordination step may include, when (Qcmd) is less than the maximum capacity of (Qmvb), supplying all of (Qcmd) with (Qmvb). Additionally, when (Qcmd) is greater than the maximum capacity of (Qmvb), the coordinating step may include supplying the maximum capacity of (Qmvb) and allocating the deficiency between (Qcmd) and (Qmvb) to one or both of (Qs) and (Ql). In one embodiment, (Qs) may have priority over (Ql) such that the deficiency between (Qcmd) and (Qmvb) is first allocated up to the maximum capacity of (Qs), and then to (Ql).

In a particular embodiment of the method, the maximum reactive power capacities for (Qmvb), (Qs), and (Ql) are determined in real-time based on any one or combination of: power system operating state; ambient temperature; or thermal constraints of the generator; power converter, or reactive power compensation device. The values for (Qmvb), (Qs), and (Ql) may be continuously or periodically determined and updated in the control system.

In a particular embodiment, the method encompasses controlling a wind turbine with a doubly fed induction generator (DFIG) system, wherein (Qcmd) is a reactive power demand made on the wind turbine. In this embodiment, the wind turbine may be one of a plurality of wind turbines within a wind farm that supplies real and reactive power to the grid, and wherein (Qcmd) is determined by a farm-level controller within the wind farm and transmitted to a local controller at the wind turbine. To supply (Qcmd), the wind turbine local controller may then allocate (Qmvb) to the reactive power compensation device, and (Qs), and (Ql) to the power converter. In an alternate embodiment, the wind turbine local controller transmits (Qcmd) to a converter controller associated with the power converter, wherein the converter controller allocates (Qmvb) to the reactive power compensation device and controls operation of the power converter to generate (Qs), and (Ql) to supply (Qcmd).

The present subject matter also encompasses a power generating system that utilizes the method discussed above. For example, the invention encompasses a wind turbine system configured to supply real and reactive power to a grid, the wind turbine system including a wind turbine with a rotor, hub, and a plurality of blades coupled to the hub. A doubly fed induction generator (DFIG) system is coupled to the rotor, the DFIG system further comprising a power converter with a line side converter (LSC) and a rotor side converter (RSC), wherein the DFIG system is configured to generate a generator stator-side reactive power (Qs) and a generator line-side reactive power (Ql). The wind turbine system further includes a dedicated reactive power compensation device operationally configured with the DFIG system to generate a reactive power (Qmvb). A local control system is configured to allocate (Qs), (Ql), and (Qmvb) according to the method discussed above to supply the reactive power demand (Qcmd) made on the DFIG.

The reactive power compensation device may be any one or combination of a Static VAR compensator (SVC), a Static VAR Generator (SVG) device, or a Static Synchronous Compensator (STATCOM) device.

It should be understood that the methods and systems may further include any combination of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of an embodiment of a wind turbine according to the present disclosure;

FIG. 2 illustrates a schematic view of an embodiment of a wind turbine DFIG system for use with the wind turbine shown in FIG. 1;

FIG. 3 is a schematic diagram of one embodiment of a power converter of a wind turbine according to the present disclosure;

FIG. 4 is a schematic diagram depicting real and reactive power flow in a wind turbine DFIG system in accordance with aspects of the present disclosure;

FIG. 5 is a diagram of a wind turbine controller embodiment in accordance with aspects of the present disclosure;

FIG. 6 is a diagram of an alternate wind turbine controller embodiment in accordance with aspects of the present disclosure;

FIG. 7 is a schematic diagram depicting various locations of a reactive power compensation device in a wind turbine DFIG system; and FIG. 8 is a flow diagram of one embodiment of a method according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for operating a power generation system that supplies real and reactive power to a grid, as discussed above, wherein the power generation system includes a generator with a power converter and a dedicated, individual integrated reactive power compensation device. The power generation system may be configured as a wind turbine with a DFIG system, wherein the wind turbine may be one of a plurality of wind turbines in a wind farm. The method includes receiving a total reactive power demand (Qcmd) made on the power generation system at a real-time operating state of the power generation system and grid state. A maximum reactive power capacity is determined for each of a generator stator-side reactive power (Qs), a generator line-side reactive power (Ql), and reactive power from the reactive power compensation device (Qmvb). Supply of (Qcmd) allocated between (Qs), (Ql), and (Qmvb) is coordinated at the real-time operating state of the power generation system and the grid state, wherein (Qmvb) is prioritized as a first source of reactive power, and one or both of (Qs) and (Ql) as a second source of reactive power.

Although not limited to such configurations, for sake of explanation, the present method and system aspects of the invention are described herein with reference to a wind turbine power generating system, and more particularly to a wind turbine DFIG system that supplies real and reactive power to a grid.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) for production of electrical energy.

Wind power generation is typically provided by a wind farm having a large number (often 100 or more) of the wind turbines 10 with associated wind turbine generators 120 (FIG. 2), wherein each individual wind turbine 10 typically experiences a unique wind force. Accordingly, the output power for each individual wind turbine generator 120 may vary from one wind turbine 10 to another wind turbine 10 within the wind farm.

As is generally understood, active power (P) and reactive power (Q) are provided by each wind turbine generator system (e.g., the system 100 depicted in FIG. 2). In some embodiments, a farm-level controller 177 (FIG. 5) provides reactive power commands (Qcmd) to the wind turbine generator system based on transmission grid needs (which may be dictated by the grid operator or determined based on grid voltage). The (Qcmd) demand may be identical for each wind turbine generator. In an alternate control methodology, the reactive power commands may be individually tailored to the wind turbine generators 120 in the wind farm based on the different power generation characteristics of the respective wind turbine generators 120, as described, for example in U.S. Pat. Pub. No. 2015/0295529. It should be appreciated that the present invention is not limited to the manner or methodology in which the reactive power command for an individual wind turbine generator 120 is generated.

Referring now to FIG. 2, a schematic diagram is provided of a wind turbine generator system embodied as a wind turbine DFIG power system 100 ("wind turbine system") in accordance with aspects of the present subject matter. Although the present subject matter will generally be described herein with reference to the system 100 shown in FIG. 2, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 2, the rotor 18 of the wind turbine 10 (FIG. 1) may, optionally, be coupled to a gear box 118, which is, in turn, coupled to the generator 120, which may be a doubly fed induction generator (DFIG).

As shown, the DFIG 120 is connected to a stator bus 154. A power converter is connected to the DFIG 120 via a rotor bus 156, and to the stator bus 154 via a line side bus 188. The stator bus 154 provides an output multiphase power (e.g. three-phase power) from a stator of the DFIG 120, and the rotor bus 156 provides an output multiphase power (e.g. three-phase power) from a rotor of the DFIG 120. The power converter 162 includes a rotor side converter (RSC) 166 and a line side converter (LSC) 168. The DFIG 120 is coupled via the rotor bus 156 to the rotor side converter 166. Additionally, the RSC 166 is coupled to the LSC 168 via a DC link 136 across which is a DC link capacitor 138. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 is coupled to a converter controller 174 in order to control the operation of the rotor side converter 166 and the line side converter 168. It should be noted that the converter controller 174 may be configured as an interface between the power converter 162 and a local wind turbine controller (control system) 176 and include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162.

As mentioned, for an individual DFIG wind turbine power system 100, the reactive power is supplied primarily by the RSC, via the generator 120 and the LSC.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from, for instance, the local control system 176 via the converter controller 174. The control signals may be based, among other things, on sensed conditions or operating characteristics of the wind turbine power system 100, and provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. In particular, as will be described below, the sensed speed may be used as a basis for adjusting the switching frequency of the switching elements (e.g., when the DIFG 120 is operating at or near its synchronous speed). Other feedback from other sensors may also be used by the controller 174 or control system 176 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 162 also compensates or adjusts the frequency of the three-phase power from the rotor for changes, for example, in the wind speed at hub 20 and blades 22. Therefore, mechanical and electrical rotor frequencies are decoupled and the electrical stator and rotor frequency matching is facilitated substantially independently of the mechanical rotor speed.

Under some conditions, the bi-directional characteristics of the power converter 162, and specifically, the bi-directional characteristics of the LSC 168 and RSC 166, facilitate feeding back at least some of the generated electrical power into generator rotor. More specifically, electrical power is transmitted from the stator bus 154 to line side bus 188 and subsequently through the line contactor 172 and into the power converter 162, specifically the LSC 168 which acts as a rectifier and rectifies the sinusoidal, three-phase AC power to DC power. The DC power is transmitted into DC link 136. Capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power with pre-determined voltages, currents, and frequencies. This conversion is monitored and controlled via converter controller 174. The converted AC power is transmitted from RSC 166 via rotor bus 156 to the generator rotor. In this manner, generator reactive power control is facilitated by controlling rotor current and voltage.

Referring now to FIG. 3, a schematic diagram of one embodiment of the power converter shown in FIG. 2 is illustrated in accordance with aspects of the present subject matter. As shown, the rotor side converter (RSC) 166 includes a plurality of bridge circuits (e.g. H-bridge circuits), with each phase of the rotor bus 156 input to the rotor side converter 166 being coupled to a single bridge circuit. In addition, the line side converter (LSC) 168 may also include a plurality of bridge circuits. Similar to the rotor side converter 166, the line side converter 168 also includes a single bridge circuit for each output phase of the line converter 168. In other embodiments, the line side converter 168, the rotor side converter 166, or both the line side converter 168 and the rotor side converter 166 may include parallel bridge circuits without deviating from the scope of the present disclosure.

Each bridge circuit may generally include a plurality of switching elements (e.g. IGBTs) coupled in series with one another. For instance, as shown in FIG. 3, each bridge circuit includes an upper IGBT (e.g. IGBT 212) and a lower IGBT (e.g. IGBT 214). In addition, a diode may be coupled in parallel with each of the IGBTs. In alternative embodiments, parallel IGBTs and diodes may be used to increase the current rating of the converter. As is generally understood, the line side converter 168 and the rotor side converter 166 may be controlled, for instance, by providing control commands, using a suitable driver circuit, to the gates of the IGBTs. For example, the converter controller 174 may provide suitable gate timing commands to the gates of the IGBTs of the bridge circuits. The control commands may control the switching frequency of the IGBTs to provide a desired output. It should be appreciated by those of ordinary skill in the art that, as an alternative to IGBTs, the power convertor 162 may include any other suitable switching elements.

FIG. 4 depicts real (P) and reactive (Q) power flow in a wind turbine power system 100 configured with a DFIG system 102. As understood in the art, the primary source of reactive power in the DFIG system is from the RSC 166 via the generator 102 (generator stator-side reactive power (Qs)) and from the RSC 166 via the LSC 168 (generator line-side reactive power (Ql)). A harmonic distortion filter 175 is configured in the line side bus. Use of the power converter 162, in particular the RSC 166, to control the rotor current makes it is possible to adjust the total reactive power (Qwtg) of the system 100 fed to the grid from the RSC 166 independently of the rotational speed of the generator 102. In addition, the DFIG generator 102 is able to import or export reactive power, which allows the system to support the grid during extreme voltage fluctuations on the grid.

Still referring to FIG. 4, the wind turbine power system 100 includes an individual reactive power compensation device 200 (also referred to herein as a modular VAR Box (MVB)) that generates an auxiliary reactive power (Qmvb). In the depicted embodiment, the reactive power compensation device 200 is connected to the line side bus (with a harmonic distortion filter 175) such that (Qmvb) combines with (Ql) on the line side bus as (Q), wherein (Q) and (Qs) are combined at the three- way transformer 202. Thus, total reactive power (Qwtg) from the wind turbine power system 100 is:

(Qwtg)=(Qs)+(Q), wherein (Q)=(Ql)+(Qmvb)

Total reactive power (Qwtg) and total real power (Pwtg) are delivered from the transformer 202 to the grid.

FIG. 7 is a diagram that depicts various operational locations for integration of the reactive power compensation device 200 locally with an individual wind turbine system 100. The dashed line "A" indicates that the reactive power compensation device 200 is connected to the line side bus 188 between the LSC 168 and three-way transformer 202. In the diagram, transformer 180 may be a substation transformer at the point of interconnection (POI) with the grid. The dashed line "B" indicates that the reactive power compensation device 200 may be connected (via a transformer 204) to a bus 155 downstream of the grid breaker 182 (but in close proximity to the wind turbine system 100) or between the grid breaker 182 and the three-way transformer 202. It should be appreciated that the present subject matter is not limited to the integration locations depicted in FIG. 7, and that other suitable locations may be determined by those skilled in the art.

As mentioned, the present method encompasses controlling a wind turbine 10 with a doubly fed induction generator (DFIG) system 102, wherein the wind turbine 10 may be one of a plurality of wind turbines within a wind farm that supplies real and reactive power to the grid. Referring to FIG. 5, (Qcmd) is a reactive power demand made on the wind turbine by a farm-level controller 177 within the wind farm and transmitted to the local controller 176 at the wind turbine. The local controller may then allocate (Qmvb) to the reactive power compensation device 200 (which may include a separate controller) and allocate (Qs), and (Ql) to the converter controller 174 to control the power converter 162 in accordance with the respective reactive power demands.

FIG. 6 is an alternate embodiment wherein the local wind turbine controller 176 receives the (Qcmd) demand from the field-level controller 177 and transmits the demand to the power converter controller 174. The converter controller 174 allocates (Qmvb) to the reactive power compensation device 200 and controls the power converter 162 to generate (Qs) and (Ql).

It should be appreciated that the converter controller 174, local wind turbine controller 176, and farm level controller 177 may each correspond to any suitable computing device and/or any combination of computing devices. For instance, a controller may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller to perform various functions, such as the steps disclosed herein.

Referring now to FIG. 8, a flow diagram of an embodiment of a method 300 for operating a power generation system is illustrated in accordance with aspects of the present subject matter. In general, the method 300 is described herein as implemented using a wind turbine system 100, such as the DFIG wind turbine power system 100 described above. However, it should be appreciated that the disclosed method 300 may be implemented using any other suitable power generation system that is configured to supply power, including reactive power, for application to a load, such as a power grid. In addition, although FIG. 8 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

At (302), the method 300 includes receiving a reactive power command (Qcmd) at the wind turbine power system, wherein (Qcmd) may be generated by a farm-level controller in a wind farm.

At (304), the reactive power capacity is determined for each of the reactive power compensation device (Qmvb), the generator stator-side (Qs), and the generator line-side (Ql) at the wind turbine power system.

At (306), a determination is made of whether the capacity of the reactive power compensation device (Qmvb) can satisfy the (Qcmd) demand. If so, at (308), the local controller 176 (or the converter controller 174, as discussed above) allocates up to the maximum of (Qmvb) to supply (Qcmd), and the process ends at (310) until a new (Qcmd) demand is generated.

If (Qmvb) cannot fully supply the (Qcmd) demand, then at (312) the maximum capacity of (Qmvb) is allocated to (Qcmd) and the deficit amount of reactive power to be supplied by the generator/power converter [(Qs) and/or (Ql)] is determined (Qdef=Qcmd−Qmvb).

At (314), a determination is made of whether the maximum capacity of (Qs) can satisfy (Qdef). If so, at (316), the local controller 176 (or the converter controller 174, as discussed above) allocates up to the maximum capacity of (Qs) to satisfy (Qdef), and the process ends at (318) until a new (Qcmd) demand is generated.

If (Qdef) is greater than the max capacity of (Qs), then at step (320) the maximum of (Ql) is also allocated to (Qdef).

At (322), if (Qcmd) is satisfied by (Qmvb)+(Qs)+(Ql), then the process ends at (324) until a new (Qcmd) is generated.

If (Qcmd) cannot be satisfied by (Qmvb)+(Qs)+(Ql), then a final deficit (Qdef) is computed at (326) and the system switches to a VAR deficit Mode wherein real power production from the system 100 is decreased so that reactive power production can increase.

The maximum reactive power capacities for (Qmvb), (Qs), and (Ql) are determined in real-time based on any one or combination of: power system operating state; ambient temperature; or thermal constraints of the generator; power converter, or reactive power compensation device. The values for (Qmvb), (Qs), and (Ql) may be continuously or periodically determined and updated in the control system.

Various aspects and embodiments of the present invention are defined by the following numbered clauses:

1. A method for operating a power generation system that supplies real and reactive power to a grid, the power generation system including a generator with a power converter, and a dedicated reactive power compensation device, the method comprising:

receiving a total reactive power demand (Qcmd) made on the power generation system at an operating state of the power generation system and grid state; determining a maximum reactive power capacity for each of a generator stator side reactive power (Qs), a generator line-side reactive power (Ql), and reactive power from the reactive power compensation device (Qmvb);

coordinating supply of (Qcmd) from between (Qs), (Ql), and (Qmvb) at the operating state of the power generation system and the grid state by prioritizing (Qmvb) as a first source of reactive power, and one or both of (Qs) and (Ql) as a second source of reactive power.

2. The method as in clause 1, wherein in the coordinating step, when (Qcmd) is less than the maximum capacity of (Qmvb), then all of (Qcmd) is supplied by (Qmvb).

3. The method as in any one of clauses 1-2, wherein in the coordinating step, when (Qcmd) is greater than the maximum capacity of (Qmvb), then the maximum capacity of (Qmvb) is supplied and a deficiency between (Qcmd) and (Qmvb) is allocated to one or both of (Qs) and (Ql).

4. The method as in any one of clauses 1-3, wherein in the coordinating step, (Qs) has priority over (Ql) such that the deficiency between (Qcmd) and (Qmvb) is first allocated up to the maximum capacity of (Qs), and then to (Ql).

5. The method as in any one of clauses 1-4, wherein the maximum reactive power capacities for (Qmvb), (Qs), and (Ql) are determined based on any one or combination of: power system operating state; ambient temperature; or thermal constraints of the generator; power converter, or reactive power compensation device.

6. The method as in any one of clauses 1-5, wherein the maximum reactive power capacities for (Qmvb), (Qs), and (Ql) are continuously or periodically determined.

7. The method as in any one of clauses 1-6, wherein the power generation system comprises a wind turbine with a doubly fed induction generator (DFIG) system, and wherein (Qcmd) is a reactive power demand made on the wind turbine.

8. The method as in any one of clauses 1-7, wherein the wind turbine is one of a plurality of wind turbines within a wind farm that supplies real and reactive power to the grid, and wherein (Qcmd) is determined by a field-level controller within the wind farm and transmitted to a local controller at the wind turbine.

9. The method as in any one of clauses 1-8, wherein the local controller allocates (Qmvb) to the reactive power compensation device and allocates (Qs), and (Ql) to the power converter.

10. The method as in any one of clauses 1-9, wherein the local controller transmits (Qcmd) to a converter controller associated with the power converter, wherein the converter controller allocates (Qmvb) to the reactive power compensation device and controls operation of the power converter to generate (Qs), and (Ql).

11. A wind turbine system configured to supply real and reactive power to a grid, comprising:
a wind turbine with a rotor, hub, and a plurality of blades coupled to the hub;
a doubly fed induction generator (DFIG) system coupled to the rotor, the DFIG system further comprising a power converter with a line side converter (LSC) and a rotor side converter (RSC), wherein the DFIG system is configured to generate a generator stator-side reactive power (Qs) and a generator line-side reactive power (Ql);
a dedicated reactive power compensation device operationally configured with the DFIG system to generate a reactive power (Qmvb);
a control system configured to: receive a reactive power command (Qcmd) made on the wind turbine system;
determine a maximum reactive power capacity for each of (Qs), (Ql), and (Qmvb) at an operating state of the wind turbine system and a grid state; and coordinate supply of reactive power between (Qs), (Ql), and (Qmvb) at the operating state of the wind turbine system and the grid state to meet (Qcmd) by prioritizing (Qmvb) as a first source of reactive power, and one or both of (Qs) and (Ql) as a second source of reactive power.

12. The wind turbine system as in clause 11, wherein the wind turbine is one of a plurality of wind turbines within a wind farm that supplies real and reactive power to the grid, the control system comprising a field-level controller in the wind farm that determines and transmits (Qcmd) and a local controller at the wind turbine that receives the (Qcmd) transmitted by the field-level controller.

13. The wind turbine system as in any one of clauses 11-12, wherein to meet (Qcmd), the local controller allocates (Qmvb) to the reactive power compensation device and allocates (Qs), and (Ql) to the power converter.

14. The wind turbine system as in any one of clauses 11-13, further comprising a converter controller associated with the power converter, wherein to meet (Qcmd), the local controller transmits (Qcmd) to the converter controller, wherein the converter controller allocates (Qmvb) to the reactive power compensation device and controls operation of the power converter to generate (Qs), and (Ql).

15. The wind turbine system as in any one of clauses 11-14, wherein the reactive power compensation device comprises any one or combination of a Static VAR compensator (SVC), a Static VAR Generator (SVG) device, or a Static Synchronous Compensator (STATCOM) device.

16. The wind turbine system as in any one of clauses 11-15, wherein the control system is configured to supply all of (Qcmd) with (Qmvb) when (Qcmd) is less than the maximum capacity of (Qmvb).

17. The wind turbine system as in any one of clauses 11-16, wherein when (Qcmd) is greater than the maximum capacity of (Qmvb), the control system is configured to supply (Qcmd) with the maximum capacity of (Qmvb) and allocate a deficiency between (Qcmd) and (Qmvb) to one or both of (Qs) and (Ql).

18. The wind turbine system as in any one of clauses 11-17, wherein the control system is configured to prioritize (Qs) over (Ql) such that the deficiency between (Qcmd) and (Qmvb) is first allocated up to the maximum capacity of (Qs), and then to (Ql).

19. The wind turbine system as in any one of clauses 11-18, wherein the control system determines the maximum reactive power capacities for (Qmvb), (Qs), and (Ql) based on any one or combination of: power system operating state; ambient temperature; or thermal constraints of the generator; power converter, or reactive power compensation device.

20. The wind turbine system as in any one of clauses 11-19, wherein the control system continuously or periodically determines the maximum reactive power capacities for (Qmvb), (Qs), and (Ql).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a power generation system that supplies real and reactive power to a grid, the power generation system including a generator with a power converter, and a dedicated reactive power compensation device, the method comprising:
receiving a total reactive power demand (Qcmd) made on the power generation system at an operating state of the power generation system and grid state;
determining a maximum reactive power capacity for each of a generator stator side reactive power (Qs), a generator line-side reactive power (Ql), and reactive power from the reactive power compensation device (Qmvb);
coordinating supply of (Qcmd) from between (Qs), (Ql), and (Qmvb) at the operating state of the power generation system and the grid state by prioritizing (Qmvb) as a first source of reactive power, and one or both of (Qs) and (Ql) as a second source of reactive power.

2. The method as in claim 1, wherein in the coordinating step, when (Qcmd) is less than the maximum capacity of (Qmvb), then all of (Qcmd) is supplied by (Qmvb).

3. The method as in claim 2, wherein in the coordinating step, when (Qcmd) is greater than the maximum capacity of (Qmvb), then the maximum capacity of (Qmvb) is supplied and a deficiency between (Qcmd) and (Qmvb) is allocated to one or both of (Qs) and (Ql).

4. The method as in claim 3, wherein in the coordinating step, (Qs) has priority over (Ql) such that the deficiency between (Qcmd) and (Qmvb) is first allocated up to the maximum capacity of (Qs), and then to (Ql).

5. The method as in claim 1, wherein the maximum reactive power capacities for (Qmvb), (Qs), and (Ql) are determined based on any one or combination of: power system operating state; ambient temperature; or thermal constraints of the generator;

power converter, or reactive power compensation device.

6. The method as in claim 5, wherein the maximum reactive power capacities for (Qmvb), (Qs), and (Ql) are continuously or periodically determined.

7. The method as in claim 1, wherein the power generation system comprises a wind turbine with a doubly fed induction generator (DFIG) system, and wherein (Qcmd) is a reactive power demand made on the wind turbine.

8. The method as in claim 7, wherein the wind turbine is one of a plurality of wind turbines within a wind farm that supplies real and reactive power to the grid, and wherein (Qcmd) is determined by a field-level controller within the wind farm and transmitted to a local controller at the wind turbine.

9. The method as in claim 8, wherein the local controller allocates (Qmvb) to the reactive power compensation device and allocates (Qs), and (Ql) to the power converter.

10. The method as in claim 8, wherein the local controller transmits (Qcmd) to a converter controller associated with the power converter, wherein the converter controller allocates (Qmvb) to the reactive power compensation device and controls operation of the power converter to generate (Qs), and (Ql).

11. A wind turbine system configured to supply real and reactive power to a grid, comprising:
a wind turbine with a rotor, hub, and a plurality of blades coupled to the hub;
a doubly fed induction generator (DFIG) system coupled to the rotor, the DFIG system further comprising a power converter with a line side converter (LSC) and a rotor side converter (RSC), wherein the DFIG system is configured to generate a generator stator-side reactive power (Qs) and a generator line-side reactive power (Ql);
a dedicated reactive power compensation device operationally configured with the DFIG system to generate a reactive power (Qmvb);
a control system configured to:
receive a reactive power command (Qcmd) made on the wind turbine system;
determine a maximum reactive power capacity for each of (Qs), (Ql), and (Qmvb) at an operating state of the wind turbine system and a grid state; and
coordinate supply of reactive power between (Qs), (Ql), and (Qmvb) at the operating state of the wind turbine system and the grid state to meet (Qcmd) by prioritizing (Qmvb) as a first source of reactive power, and one or both of (Qs) and (Ql) as a second source of reactive power.

12. The wind turbine system as in claim 11, wherein the wind turbine is one of a plurality of wind turbines within a wind farm that supplies real and reactive power to the grid, the control system comprising a field-level controller in the wind farm that determines and transmits (Qcmd) and a local controller at the wind turbine that receives the (Qcmd) transmitted by the field-level controller.

13. The wind turbine system as in claim 12, wherein to meet (Qcmd), the local controller allocates (Qmvb) to the reactive power compensation device and allocates (Qs), and (Ql) to the power converter.

14. The wind turbine system as in claim 13, further comprising a converter controller associated with the power converter, wherein to meet (Qcmd), the local controller transmits (Qcmd) to the converter controller, wherein the converter controller allocates (Qmvb) to the reactive power compensation device and controls operation of the power converter to generate (Qs), and (Ql).

15. The wind turbine system as in claim 11, wherein the reactive power compensation device comprises any one or combination of a Static VAR compensator (SVC), a Static VAR Generator (SVG) device, or a Static Synchronous Compensator (STATCOM) device.

16. The wind turbine system as in claim 11, wherein the control system is configured to supply all of (Qcmd) with (Qmvb) when (Qcmd) is less than the maximum capacity of (Qmvb).

17. The wind turbine system as in claim 16, wherein when (Qcmd) is greater than the maximum capacity of (Qmvb), the control system is configured to supply (Qcmd) with the maximum capacity of (Qmvb) and allocate a deficiency between (Qcmd) and (Qmvb) to one or both of (Qs) and (Ql).

18. The wind turbine system as in claim 17, wherein the control system is configured to prioritize (Qs) over (Ql) such that the deficiency between (Qcmd) and (Qmvb) is first allocated up to the maximum capacity of (Qs), and then to (Ql).

19. The wind turbine system as in claim 11, wherein the control system determines the maximum reactive power capacities for (Qmvb), (Qs), and (Ql) based on any one or combination of: power system operating state; ambient temperature; or thermal constraints of the generator; power converter, or reactive power compensation device.

20. The wind turbine system as in claim 11, wherein the control system continuously or periodically determines the maximum reactive power capacities for (Qmvb), (Qs), and (Q1).

* * * * *